United States Patent
Ludwig

(10) Patent No.: US 10,948,308 B2
(45) Date of Patent: Mar. 16, 2021

(54) SYSTEMS AND METHODS FOR ADAPTIVE CONTENT FILTERING

(71) Applicant: Xevo Inc., Bellevue, WA (US)

(72) Inventor: John Ludwig, Bellevue, WA (US)

(73) Assignee: XEVO INC., Bellevue, WA (US)

( * ) Notice: Subject to any disclaimer, the term of this patent is extended or adjusted under 35 U.S.C. 154(b) by 205 days.

(21) Appl. No.: 16/210,207

(22) Filed: Dec. 5, 2018

(65) Prior Publication Data

US 2020/0182643 A1 Jun. 11, 2020

(51) Int. Cl.
| | |
|---|---|
| G01C 21/34 | (2006.01) |
| H04N 21/81 | (2011.01) |
| G01C 21/36 | (2006.01) |
| H04W 4/44 | (2018.01) |
| H04W 4/021 | (2018.01) |

(52) U.S. Cl.
CPC ..... *G01C 21/3476* (2013.01); *G01C 21/3605* (2013.01); *G01C 21/3682* (2013.01); *H04N 21/812* (2013.01); *H04W 4/021* (2013.01); *H04W 4/44* (2018.02)

(58) Field of Classification Search
CPC ............ G01C 21/3476; G01C 21/3605; G01C 21/3682; H04W 4/44; H04W 4/021; H04N 21/812
USPC ....................................................... 701/516
See application file for complete search history.

(56) References Cited

U.S. PATENT DOCUMENTS

| | | | |
|---|---|---|---|
| 6,792,351 B2 | 9/2004 | Lutter | |
| 2007/0011704 A1* | 1/2007 | Anglin, Jr. | H04N 21/4182 725/46 |
| 2011/0060496 A1* | 3/2011 | Nielsen | G06Q 10/0631 701/31.4 |
| 2016/0306615 A1 | 10/2016 | Ricci | |
| 2017/0371608 A1 | 12/2017 | Wasserman | |

OTHER PUBLICATIONS

U.S. Appl. No. 16/385,760, filed Apr. 16, 2019, "Systems and Methods for Adaptive Protocol Implementation for Vehicle Head Units," Inventor: John Ludwig.
PCT/US2019/63204—International Search Report and Written Opinion, dated Feb. 18, 2020, 14 pages.

\* cited by examiner

*Primary Examiner* — Gertrude Arthur Jeanglaude
(74) *Attorney, Agent, or Firm* — Seed IP Law Group LLP

(57) ABSTRACT

Technologies are disclosed herein for selecting one or more content instances of a plurality of content instances for display on a head unit of a vehicle. The content instances correspond to a location of a vehicle and are received by the head unit. The head unit obtains vehicle specific information from memory of the head unit. Based on the vehicle specific information, the head unit selects the one or more content instances using a set of criteria for determining which, if any, content instances to display. Selection of the one or more content instances using the set of criteria may involve consideration of information associated with individual instances of the plurality of content instances. The selected one or more content instances are displayed on a display of the head unit.

19 Claims, 10 Drawing Sheets

SYSTEMS AND METHODS FOR ADAPTIVE CONTENT FILTERING

BACKGROUND

Technical Field

The present disclosure relates to selective presentation of content to a user of a vehicle.

Description of the Related Art

Some newer model vehicles are provided with a display unit, called a head unit, with which a user can interact to monitor and control various aspects of the vehicle. Using the head unit, users can control temperature settings for the vehicle interior, access maps showing the vehicle's location, and control playback of audio content through the vehicle's audio system. Although some head units may be equipped to display media content, such as video or image content, privacy issues have limited the scope of media content that the head units can display. For instance, a user of the head unit may wish to be alerted to locations that may align with their interests or a sale at another destination proximate to the vehicle. However, users of the head unit may wish to protect personal information, vehicle information, or location information from being shared over a network with unauthorized third parties. In some jurisdictions, privacy laws may prohibit the sharing of such personal information with third parties. Until now, this conflict between user privacy and convenience has limited users from being able to experience the potential advantages of content on head units.

BRIEF SUMMARY

Briefly stated, embodiments are directed toward presenting content instances selected from among a plurality of content instances, such as via a head unit, to a user of a vehicle based on information specific to the vehicle. The plurality of content instances are transmitted by one or more antennae in a target geographical area. This target geographical area may be defined by zip code, city, county, particular antennae, or other geographical boundaries. In various embodiments, the geographical area is limited or defined by which antennae are transmitting the content and the transmission range of the transmitting antennae. The plurality of content instances, in at least some embodiments, includes visual content, audio content, audiovisual content, or other information related to locales within the target geographic area.

The head unit receives the plurality of content instances and evaluates which, if any, of the plurality of content instances to display based on the vehicle specific information, which is stored in memory. The vehicle specific information used to select the content instances to display may include information regarding the vehicle itself, such as vehicle make, model, class, included features or options, or mileage. In some embodiments, the vehicle specific information may also include information regarding users of the vehicle, such as information regarding demographics or interests. The vehicle specific information is protected in memory of the head unit or otherwise on the vehicle, such that the head unit and vehicle are prevented from transmitting the vehicle specific information to third parties. Advantageously, this enables the head unit to provide targeted content to vehicle users without exposing the users' private information.

The head unit may utilize a set of criteria to determine which, if any, content instances to display in a target vehicle. The set of criteria may analyze the vehicle specific information and target vehicle information associated with individual instances of the plurality of content instances. As a result of determining a match or correspondence between the vehicle specific information and the target vehicle information, the head unit may cause the content instances associated with the vehicle target information to be displayed on the display of the head unit. Users of the vehicle may therefore be provided with useful and pertinent content, such as content related to their interests, demographics, or vehicle characteristics, without providing potentially sensitive or protected data to third parties.

DETAILED DESCRIPTION

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks and the vehicle environment, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

References to the term "set" (e.g., "a set of items"), as used herein, unless otherwise noted or contradicted by context, is to be construed as a nonempty collection comprising one or more members or instances.

Figure 1:
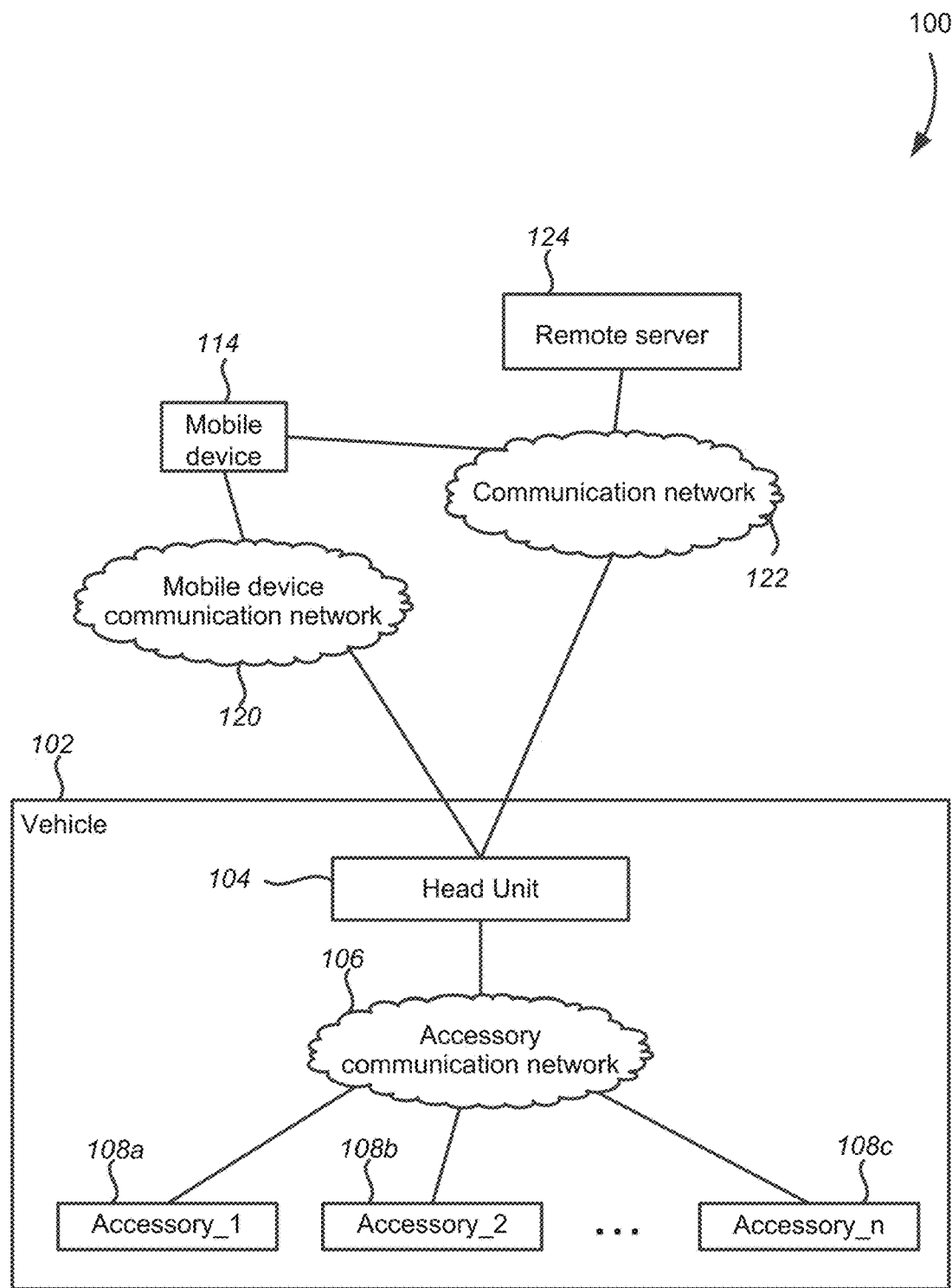
FIG. 1 illustrates a context diagram of a vehicle environment for selecting and presenting content on a head unit of the vehicle to a user in accordance with embodiments described herein.

FIG. 1 illustrates a context diagram of a vehicle environment for selecting and presenting content on a head unit of the vehicle to a user in accordance with embodiments described herein. System 100 includes a vehicle 102 and a plurality of mobile devices 114.

The mobile device 114 includes any device capable of communicating with each other or a head unit 104 of the vehicle 102. The mobile device 114 is structured to send and receive content and controls to and from the head unit 104 or other mobile devices 114. Examples of mobile devices 114 include, but are not limited to, laptop computers, smart phones, tablet computers, wearable computing devices, or other handheld computing devices.

The vehicle 102 is virtually any means of transportation that includes a head unit 104. Thus, embodiments described herein may be employed in automobiles, aerial vehicles, water vessels, railroad vehicles, and other modes of transportation that include a head unit.

The head unit 104 is a computing device in a vehicle that provides interactive controls to a user or occupant of the vehicle. As used herein, the terms user and occupant are interchangeable and refer to any person interacting with the head unit 104, the vehicle 102, or any of the mobile devices 114. The head unit 104 is utilized to control one or more accessories 108a-108c or to receive information or data from one or more accessories 108a-108c. The head unit 104 can display the received information or data, or it can provide it to other devices, such as one or more of mobile devices 114.

The accessories 108a-108c can include any vehicle utility or device that is controllable by the user. Examples of these accessories include, but are not limited to, adjustable seats, sun roof, side mirrors, rear-view mirror, air conditioner, power windows, or other controllable features of the vehicle 102. Accessories 108a-108c also include virtually any vehicle utility or device that provides information to the user. Examples of these accessories include, but are not limited to, speedometer, odometer, oil pressure gauge, temperature gauge, or other vehicle sensor that provides information to a user of the vehicle. Accessories 108a-108c further include applications executing on the head unit 104 that have two-way interaction with the user. Examples of these accessories include, but are not limited to, navigation, audio and radio controls, television or music applications, environmental control applications, vehicle performance or maintenance applications, or other applications. It should be noted that some accessories may only output data, some accessories may only receive controls to manipulate the accessory, and some accessories may input and output data. For example, a speedometer may only output the current speed of the vehicle; a power window may only receive controls to move the window up or down, but not return any information to the head unit; and the navigation system may receive controls for a destination and also return a suggested travel route to the destination. It should be noted that these examples are non-exhaustive and other types of accessories may also be employed.

The head unit 104 communicates with the accessories 108a-108c via an accessory communication network 106. The accessory communication network 106 is configured to couple the accessories 108a-108c with the head unit 104 to transmit content/data between the accessories 108a-108c and the head unit 104. The information communicated between devices may include current accessory status or data, accessory control data, video data, voice data, image data, text data, or other types of data or information. The accessory communication network 106 may include one or more physical networks; one or more wireless communication networks; one or more application program interfaces; or one or more other networks capable of transmitting data from one accessory to another, from an accessory to the head unit 104, or from the head unit to an accessory; or some combination thereof depending on the types of accessories communicating with the head unit 104. For example, the accessory communication network 106 may include an automotive body network, such as a wired controller area network, short range wireless communication network, such as personal area networks utilizing classic Bluetooth or Bluetooth Low energy protocols, or any other type of network.

The head unit 104 communicates with the mobile device 114 via a mobile device communication network 120. The mobile device communication network 120 is configured to couple the mobile device 114 with the head unit 104 to transmit content/data between the mobile device 114 and the head unit 104. The information communicated between devices may include current accessory status or data, requests to access accessory data, requests to control or modify an accessory, video data, voice data, image data, text data, or other types of data or information. The mobile device communication network 120 may include a variety of short-range wireless communication networks, such as personal area networks utilizing classic Bluetooth or Bluetooth Low energy protocols, an IR optical network, or network 120, to enable communication between the mobile device 114 and the head unit 104. In this arrangement, the mobile device 114 may exchange signals directly with the head unit 104 without the assistance of a long-range wireless network. Because the mobile device 114 may communicate with other networks, such as cellular or Wi-Fi networks, the mobile device 114 may serve as a connection point to these networks for the head unit 104.

In other cases, the head unit 104 may be equipped with an embedded modem to enable the head unit 104 to exchange signals with these networks without requiring the assistance of the mobile device 114 to do so. In this example, however, the mobile device 114 may continue to be paired with the head unit 104 through the mobile device communication network 120.

In various embodiments, the mobile device communication network 120 and the accessory communication network 106 are separate communication networks. It should be understood that in various embodiments, the mobile device 114 cannot connect to and communicate directly with the accessories 108a-108c. The head unit 104 acts as a gateway or bridge between the mobile device 114 and the accessories 108a-108c. In some embodiments, the head unit 104 provides various authentication and verification technologies for permitting or restricting the transfer of accessory data to the mobile device 114 or enabling the mobile device 114 to control an accessory 108a-108c.

In one alternative, the head unit 104 is not a bridge between the mobile device 114 and the accessories 108a-108c but is just a permission unit. There might be one network that connects the mobile device 114 directly to an accessory 108a-108c, and the head unit 104 will grant permission for communication to occur between the mobile device and the accessory but is not in the communication itself. The head unit 104 can provide various functions, including, but not limited to, connection handling, data binding, data broadcasting, data marshalling, or other data control techniques or functionality.

In some embodiments, the head unit 104 communicates with a remote server 124 via a communication network 122. The remote server 124 may store or maintain content instances. As described herein, in some embodiments, the information received by the head unit 104 may include a reference to the content instances, such as a URL. Accordingly, the head unit 104 can request specific content instances from the remote server 124 via communication network 122, and the remote server 124 can respond with the requested content instances.

Figure 2:
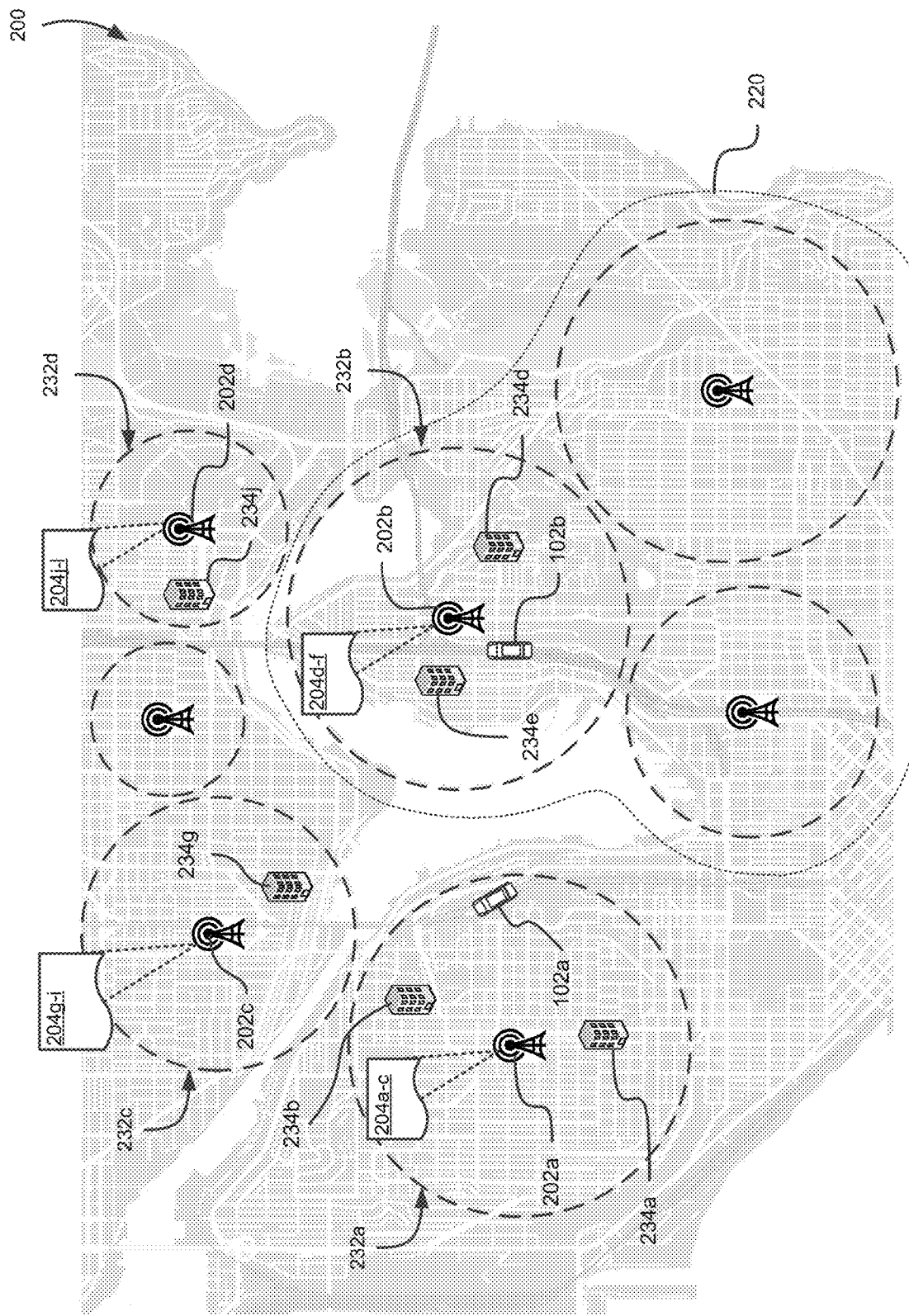
FIG. 2 illustrates an environment in which a plurality of antennae each respectively transmits a plurality of content instances to transmission regions in accordance with embodiments described herein.

FIG. 2 illustrates an environment 200 in which a plurality of antennae 202 respectively transmit a plurality of content instances 204. The plurality of content instances 204 are received by vehicles 102 travelling in a corresponding transmission region 232. The vehicles 102 are equipped with a head unit 104 of FIG. 1 that can present the plurality of content instances 204.

Each of the plurality of antennae 202 transmits a plurality of content instances 204 within a corresponding transmission region 232. For instance, a first antenna 202a transmits a first plurality of content instances 204a through 204c within a first region 232a, a second antenna 202b transmits a second plurality of content instances 204d through 204f within a second region 232b, a third antenna 202c transmits a third plurality of content instances 204g through 204i within a third region 232c, a fourth antenna 202d transmits a fourth plurality of content instances 204j through 204l within a fourth region 232d, and so forth. As a result, a first vehicle 102a located in the first transmission region 232a can receive the first plurality of content instances 204a-c, which may be different than the second plurality of content instances 204d-f received by a second vehicle 102b located in the second transmission region 232b.

Each of the content instances 204 includes or corresponds to content that may be different than the content of the other content instances within the same transmission region and may be different than the content instances of other transmission regions. For instance, the content instance 204a corresponds to content different from the content instances 204b and 204c within the first region 232a, and the content instance 204a corresponds to content different from the content of content instances within another region 232.

A transmission region 232 for a first plurality of content instances 204 may be different from a transmission region 232 for a second plurality of content instances 204. For instance, the content instances 204a-c may be transmitted in a transmission region 232a that has a larger geographic region than the geographic area of the transmission region 232d of the content instance 204j-1. Although only a single antenna 202 is depicted as transmitting a corresponding plurality of content instances 204 (i.e., each antenna 202 transmits separate content instances 204), a plurality of antennae 202 may also be used to transmit a same plurality of content instances 204. A plurality of antennae 202a, for example, may transmit the plurality of content instances 204a-c within a target geographic area 220, which may be defined by zip code, city, neighborhood, antenna select and transmission ranges, or the like, or some combination thereof.

The antennae 202 may be of varying types and power and may cover different sizes of geographic regions. Individual antennas 202 may be configured to transmit to zip codes, neighborhoods, statistical areas (e.g., primary statistical areas, core based statistical areas, metropolitan statistical areas), etc. In some embodiments, a plurality of smaller antennae 202, such as network routers or cellular routers, may be distributed throughout a geographic region to comprise a transmission region 232, such as illustrated by geographic area 220. A transmission region 232 may include a plurality of different types of antennae 202 transmitting the plurality of content instances 202.

At least some content instances 204 may correspond to locations 234 within the respective transmission regions 232. The locations 234 may be commercial establishments that wish to promote awareness of their existence, location, or services or goods offered. A first content instance 204a transmitted within the first region 232a may correspond to a first location 234a within the first region 232a. As another example, a second content instance 204b may include content representative of a second location 234b within the first region 232a. Some individual content instances 204 may include content representative of the corresponding location—for example, content representative of a name and/or specific geographic location (e.g., street address, coordinates) within the region 232. Some individual content instances may include content representative of the goods and/or services offered at the location.

As a vehicle 102 transitions from one transmission region to another transmission region, the vehicle 102 begins receiving a different plurality of content instances for that new transmission region. For instance, the first vehicle 102a travelling in the first transmission region 232a and that transitions to the third transmission region 232c will begin receiving the third plurality of content instances 204g-i and stop receiving the first plurality of content instances 204a-c. The third plurality of content instances 204g-i received by the first vehicle 102a may include content corresponding to a seventh location 234g in the third transmission region 232c, which was not transmitted in the first transmission region 232a. Although each transmission region 232 of the environment 300 is separate from the other transmission regions, parts of adjacent transmission regions may overlap in some embodiments. Furthermore, the head unit 104 of each vehicle 102 may receive the plurality of content instances 204 without requesting the plurality of content instances 204 and without transmitting any notification regarding the location of the vehicle 102. As described herein, the head units 104 of each vehicle 102 determine which, if any, of the content instances 204 to present based at least in part on target vehicle information included in or associated with corresponding content instances 204.

As one example, the first vehicle 102a travelling in the first transmission region 232a receives the first plurality of content instances 204a through 204c transmitted by the first antenna 202a. The head unit 104 of the first vehicle 102a processes target vehicle information 205 (see FIG. 4) associated with each of the respective first plurality of content instances 204a-204c to determine which, if any, of the first plurality of content instances 204a-204c to display on the head unit 104. The determination by the head unit 104 regarding which, if any, of the content instances 204a-204c to display is based on vehicle specific information 212 (see FIG. 3) specific to the first vehicle 102a. As a result of, for example, determining a correspondence between the target vehicle information 205a of a first content instance 204a and the vehicle specific information 212, content of the first content instance 204a is presented (e.g., displayed) on the head unit 104. The content presented may be, for example, an advertisement for, or an icon representative of, a store located in or near the corresponding transmission region.

The first vehicle 102a may then exit the first transmission region 232a and enter the third transmission region 232c, wherein the first vehicle 102a begins receiving the third plurality of content instances 204g through 204i. The head unit 104 may cease to display the first content instance 204a and make a determination regarding which, if any, of the third plurality of content instances 204g through 204i to present using target vehicle information 205 associated therewith. In connection with receiving and determining whether to present the content instances 204, the vehicle 102 or head unit 104 do not transmit the vehicle specific information 212 or other potentially sensitive information regarding a user or the vehicle 102, or even send a request for the content instances 204. As a result, the privacy and the potentially sensitive information of the user or the vehicle 102 is preserved.

Figure 3:
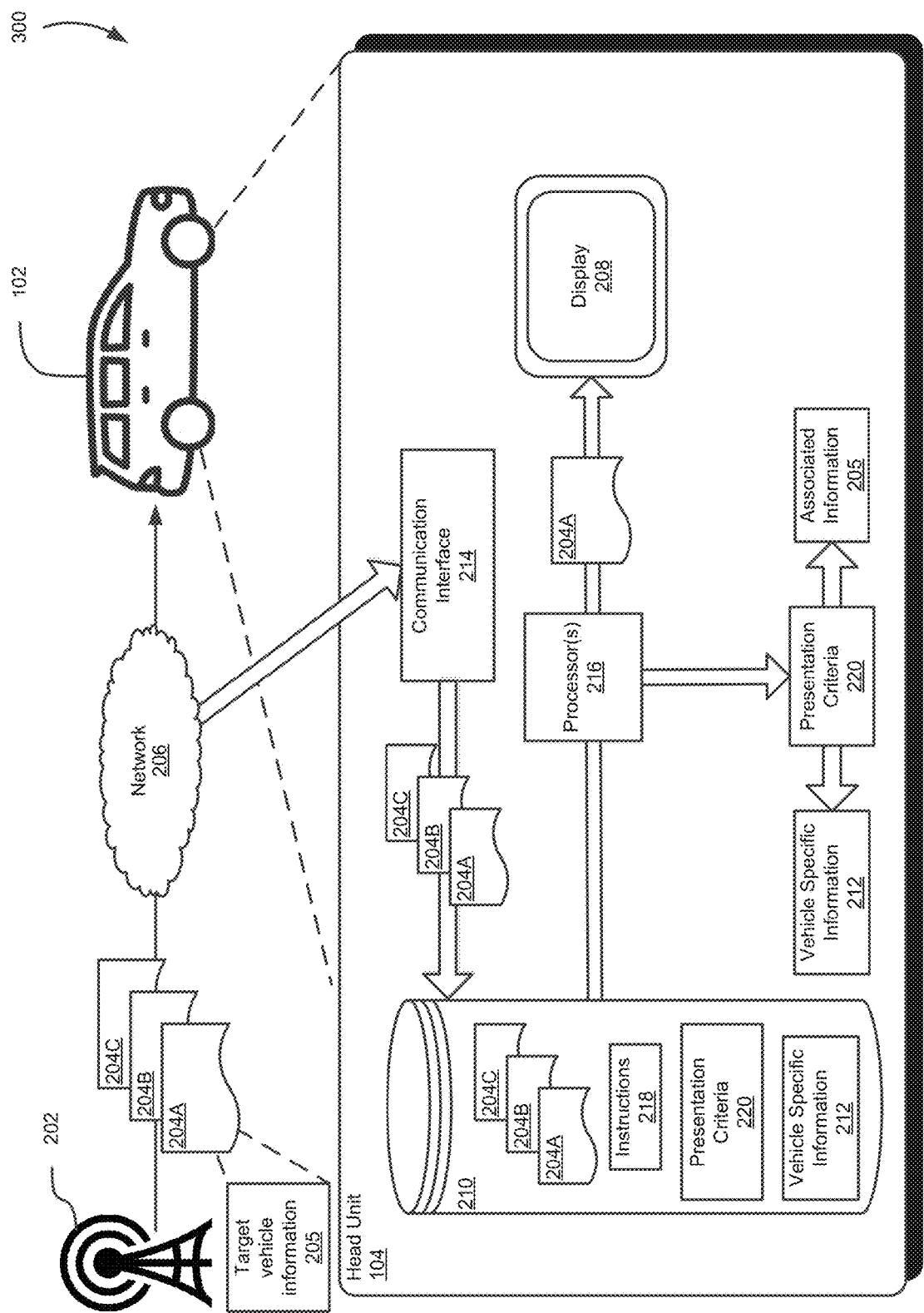
FIG. 3 illustrates an environment in which a plurality of content instances are received and evaluated for display on the head unit in accordance with embodiments described herein.

FIG. 3 illustrates an environment 300 in which a head unit of a vehicle receives content and determines which content to present to a user according to one or more embodiments. The environment 300 includes one or more transmission antennae 202 transmitting a plurality of content instances 204 over a network 206 to a head unit 104 of a vehicle 102. Each of the content instances 204 correspond to audio, image, or video content that, as a result of being processed, cause presentation of content by the head unit 104. As one example, individual instances of the plurality of content instances 204 may include one or more video or image data objects that cause presentation of video or image(s) on the display 208 as a result of processing the data object(s). As another example, the data objects may be links or references that, as a result of being processed, cause the head unit 104 to access video or image content in memory 210 of the head unit 104 or remotely access video or image content via the network 206. As yet a further example, the plurality of content instances 204 may include one or more audio data objects that, as a result of being processed, cause an audio system of or associated with the head unit 104 to emit corresponding audio.

The content may be displayed on the display 208 and may include vehicle maintenance suggestions, advertisements, reminders, map locations, etc., that are presented based at least in part on information specific to the vehicle 102. The memory 210 may include read-only memory (ROM) and/or random-access memory (RAM), and may comprise different types of memory, such as solid-state memory, hard disk drives, cache memory, and so forth. The plurality of content instances 204 may each include or have associated therewith target vehicle information 205 relating to the content of the respective content instances, as described herein. Individual content instances 204 may be received as an individual unit comprising the target vehicle information 205 and content to be presented. In some embodiments, individual content instances 204 received may include, instead of the content itself, a link or a reference to a storage location containing the content that is useable to retrieve the content. The storage location may be stored locally in the memory 210 or in some other memory of the vehicle. However, the storage location may be a storage location remote to the vehicle 102 that is accessible via the communication interface 214 and the network 206.

The plurality of content instances 204 may be transmitted to the vehicle 102 over the network 206 without the head unit 104 or the vehicle 102 previously requesting transmission of the plurality of content instances 204 or previously providing vehicle specific information 212 regarding the vehicle or users thereof to the content provider. That is, the transmission of the plurality of content instances 204 by the antenna 202 is not in response to a request to provide content instances and not in response to previous provisioning of vehicle specific information 212 by the head unit 104. The antenna 202 may be electrically communicatively connected to a set of remote servers 124 that store and provide the plurality of content instances 204 to the antenna 202 for transmission. The plurality of content instances 204 may have an encoding or format that the head unit 104 is configured to decode, convert, or otherwise successfully process. The network 206 over which the plurality of content instances 204 is transmitted corresponds to one or both of the mobile network 120 or communication network 122 described above with respect to FIG. 1.

The head unit 104 includes a communication interface 214 through which the plurality of content instances 204 are received. The communication interface 214 may include one or more antennae connected to one or more wireless network adapters, such as a cellular transceiver, Wi-Fi transceiver, Bluetooth 6 transceiver, or Zig Bee 6 transceiver. The communication interface 214 may include one or more communication bus interfaces for connecting to a communication bus of the vehicle 102 via parallel interface, serial interface, or any common or proprietary interface for communication of data. The communication interface 214 may be electrically communicatively coupled to one or more antennae of the vehicle 102 in some embodiments.

The head unit 104 includes one or more processors 216 that control operation of the head unit 104. The one or more processors 216 include microprocessors, integrated circuits, field-programmable gate arrays (FPGAs), and the like that, as a result of executing a set of instructions 218 stored in the memory 210, cause the processor(s) 216 to perform one or more operations disclosed herein. The processor 216 causes the plurality of content instances 204 received via the communication interface 214 to be stored in the memory 210.

A set of criteria 220 is stored in the memory 210 for determining which, if any, of the plurality of content instances 204 should be presented on the display 208. The set of criteria 220 defines criteria that the processor 216 may use to determine which, if any, of the plurality of content instances 204 to present on the display 208. The set of criteria 220 may include Boolean logic, conditions, and/or relationships involving content of the vehicle specific information 212 and content of the target vehicle information 205. The processor 216 may consider at least some of the vehicle specific information 212 and the target vehicle information 205 in view of the set of criteria 220 in connection with an evaluation of a content instance 204. For instance, the processor 216 may compare a subset of the vehicle specific information 212 with a corresponding subset of the target vehicle information 205a of a first content instance 204a to determine whether to present the first content instance 204a on the display 208. As a result of determining that the vehicle specific information 212 and the target vehicle information 205a of the first content instance 204a satisfies one or more of the set of criteria 220, the processor 216 may cause the display 208 to present the corresponding content. In some embodiments, the target vehicle information 205 may include criteria for evaluating whether to present the associated content instance.

The presentation criteria 220 may also include logic for determining an order or ranking of content instances 204 that have target vehicle information 205 satisfying one or more of the presentation criteria 220 or the target vehicle criteria 420 described below in comparison to the vehicle specific information 212. As explained above, the processor 216 may determine a set of content instances 204 to be displayed by the head unit 104 based on the presentation criteria 220, vehicle specific information 212, and target vehicle information 205. The processor 216 may then use the presentation criteria 220 to determine an order that content instances 204 satisfying a threshold for presentation should be displayed. For example, the processor 216 may establish a queue in which content instances 204 having a higher rate of correspondence (e.g., number of matching criteria, degree of matching criteria) with the vehicle specific information 212 are scheduled to be played before content instances 204 having a lower rate of correspondence. In at least some situations, more than one content instances 204 satisfying various criteria can be presented simultaneously—for example, one content instance may be presented on a navigation portion of the display 208 and another content instance 204 may be presented in a video presentation portion of the display 208.

In some embodiments, individual ones of the plurality of content instances 204 may include policy content that may cause the head unit 104 to perform one or more operations other than presentation of audio-visual content. The policy content may cause the head unit 104 to collect certain vehicle specific information 212 or cause the head unit 104 to communicate with other entities external to the vehicle 102. In some instances, the policy content may cause the head unit 104 to transmit a subset of the vehicle specific information 212 to a server.

Figure 4:
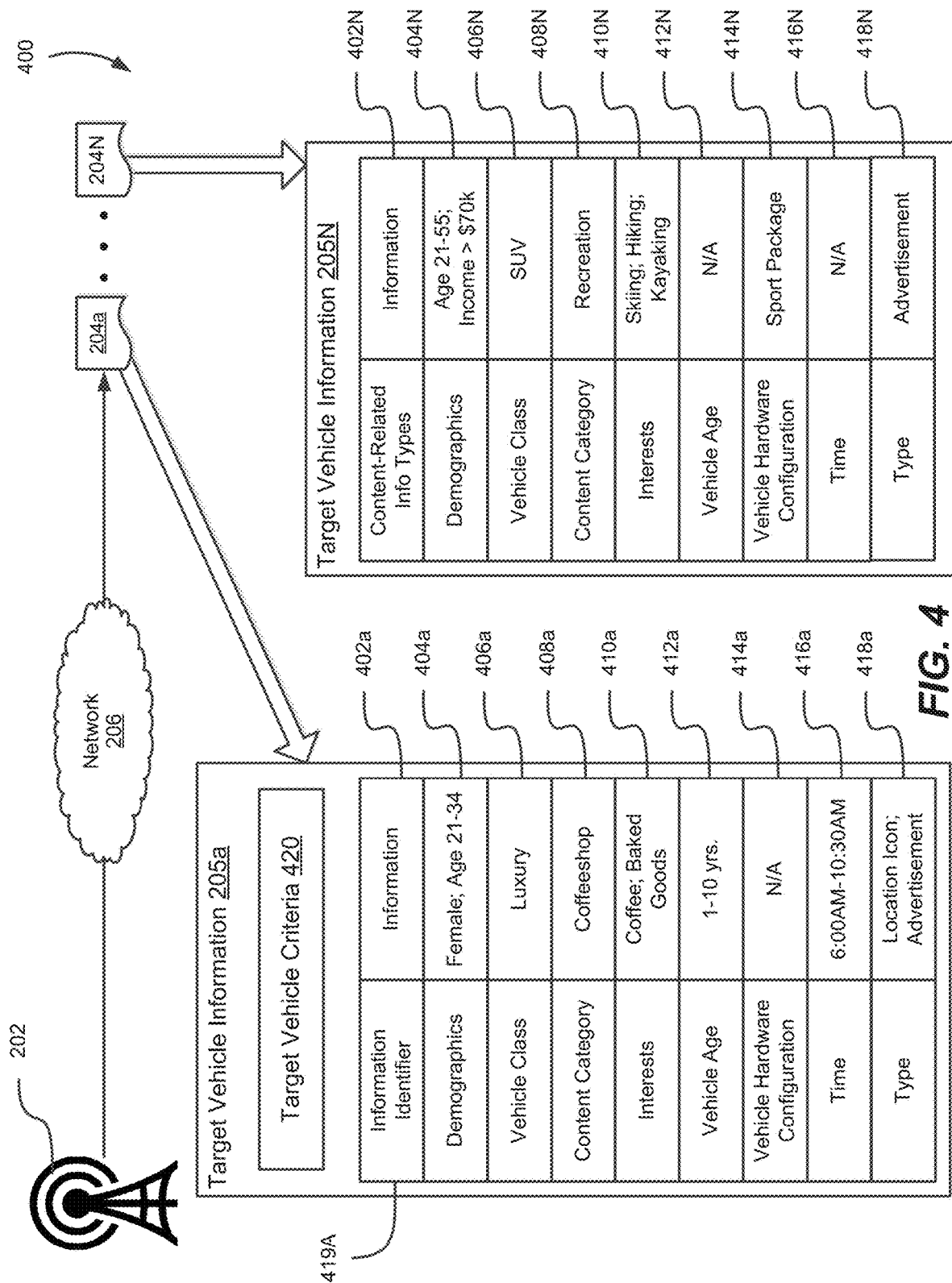
FIG. 4 illustrates an example environment in which the plurality of content instances includes associated information in accordance with embodiments described herein.

FIG. 4 illustrates an environment 400 in which an antenna 202 transmits a plurality of content instances 204 respectively having target vehicle information 205. The target vehicle information 205 is a data object, or reference to a data object, having information content 402a specifying characteristics to be considered when evaluating whether to present the content instance 204a associated therewith. The information content 402a may indicate characteristics or conditions that, if found in the vehicle specific information 212, may be favorable or adverse to a determination regarding presentation of the associated content instance 204a.

As an illustrative example, this content instance 204a may, for example, be an advertisement for a coffee shop located in a particular transmission region 232. The information content 402a identifies characteristics or conditions that would favor presenting the content instance 204a on the display 208. In this example, the information content 402a includes demographic characteristics 404a specifying preferred characteristics of a user associated with the vehicle 102 that would weigh in favor of presenting the associated content instance 204a as a result of such characteristics being found in the vehicle specific information. In particular, the demographic characteristics 404a indicates that the head unit 104 should favor presentation of the associated content instance 204a as a result of identifying that the vehicle specific information 212 includes demographic information indicating that a user is a female between the ages of 21 and 34. The demographic information may include characteristics regarding gender, age, race, income, education, nationality, etc., which may be identified by the user as described herein. As another example, the information content 402a includes vehicle class characteristics 406a specifying class, type, make, model, etc., of a vehicle that would weigh in favor of presenting the associated content instance 204a as a result of the vehicle specific information 212 including matching or similar vehicle characteristics.

The information content 402a in this example includes content characteristics 408a indicative of a category of a location, service, or goods associated with the content instance 204a. The information content 402a includes interest characteristics 410a of corresponding interests of a user, if identified in the vehicle specific information 212, that would factor in a determination of whether to present the content instance 204a. The information content 402a further includes vehicle age characteristics 412a specifying an age of the vehicle 102 that would factor in a determination of whether to present the content instance 204a. Another characteristic, vehicle hardware configuration characteristics 414a indicating configurations, features, etc., of the vehicle 102 that might factor in a determination of whether to present the content instance 204a. Here, the vehicle configuration might not be a consideration that factors into the presentation determination, so an entry for the vehicle hardware configuration characteristics 414a is omitted. Current or recent conditions may also factor into the presentation determination. The information content 402a may therefore include time characteristics 416a indicating time ranges or periods during the day in which it may be more favorable to present the content instance 204a.

The information content 402 of the target vehicle information 205 may also include type information 418 identifying a type of the associated content instance 204. The type information 418a of the target vehicle information 205a indicates that the associated content instance 204a includes an advertisement and a location icon for displaying in a navigation portion of the display 208. The type information 418 may be useful in identifying the importance, category, or use of the associated content instance 204. Content instances 204 may include important safety information for alerting or educating the user, such as a safety recall particular to the make, model, and year of the vehicle 102. Such safety information should have a relatively higher priority than advertisements, and the head unit 104 should therefore present such safety-related content before advertisements. Safety-related information may be associated with a geographical region. A safety-recall, for instance, may be issued for airbags of vehicles 102 residing along coastlines due to the relatively more corrosive properties of salt in the air. Other types of content instances 204 indicated in the type information 418 include vehicle operation information for advising users regarding operation of various features of the vehicle 102, vehicle maintenance information for advising users on how and when to perform maintenance on the vehicle 102. Further description of such content instances 204 is described below with respect to FIG. 6.

These examples are illustrative and not intended to be limiting. Those of ordinary skill in the art will appreciate that these and other characteristics, conditions, and factors may be included in the target vehicle information 205 without departing from the scope of the instant disclosure. For example, the target vehicle information 205 may include conditions related to the operation of a vehicle, like fuel level, oil pressure, radiator temperature, or battery voltage. In addition, the types of characteristics, conditions, or factors included in the target vehicle information 205 may be periodically updated. Moreover, the information content 402a may include factors, characteristics, conditions, etc., that are adverse or disqualifying to a determination regarding presentation of the content instance 204a. The information content 402a, in some instances, may be used to determine a presentation priority of one content instance relative to another—for example, an order in which a plurality of content instances 204 selected for presentation should be presented.

The information content 402a of the target vehicle information 205a may be organized in any appropriate manner. The information content 402a may be formatted as a one-dimensional array, such as a delimiter-separated value format in which a delimiter (e.g., semi-colon, comma, tab) separates different characteristics and conditions of the information content 402a. The information content 402a may be formatted as a two-dimensional array or as a table having multiple columns and headings, as shown in FIG. 4. The information content 402a may further include identifiers 419 indicating the characteristic, condition, or factor to which each entry of the information content 402a corresponds.

As a further example, another content instance 204N related to an outdoor recreation store has target vehicle information 205N for use in making a determination for presentation of the content instance 204N. The target vehicle information 205N depicted includes at least some information content 402N through 418N, which may include characteristics and/or conditions corresponding to those described above with respect to the target vehicle information 205a of the content instance 204a. Because the content instance 204N is related to a different location having goods or services different from the location related to the content instance 204a, the relevant target vehicle information 205N includes characteristics and/or conditions different from the characteristics and/or conditions of the target vehicle information 205a.

The target vehicle information 205 may include or have associated therewith target vehicle criteria 420 for determining at least in part whether to present the content instance 204. The target vehicle criteria 420 may include Boolean logic, conditions, and/or relationships involving the information content 402. The target vehicle criteria 420 may be instead of, in addition to, or in conjunction with the set of presentation criteria 220 discussed herein. The target vehicle criteria 420 may indicate certain characteristics that, if found in the vehicle specific information 212, cause the head unit 104 to determine that the associated content instance 204 should be displayed on the display 208. For instance, the target vehicle criteria 420 may specify that the associated content instance 204 should be presented if a match is identified between the information content 402 and the vehicle specific information 212. A match can be an exact match or one that falls within the range of a confidence factor for a match. The target vehicle criteria 420 may also include logic that can be used to determine a presentation priority of the associated content instance 204 relative to other content instances 204 to be presented. As a specific example, the target vehicle criteria 420 may specify that the associated content instance 204 should be displayed if the vehicle specific information 212 has demographic information matching the demographic characteristics 404, but should not be presented if the current time does not correspond to the time characteristics 416. As another example, the target vehicle criteria 420 may specify a priority ranking for the associated content instance based on a number of matches or correspondences determined between the target vehicle information 205 and the vehicle specific information 212.

Figure 5:
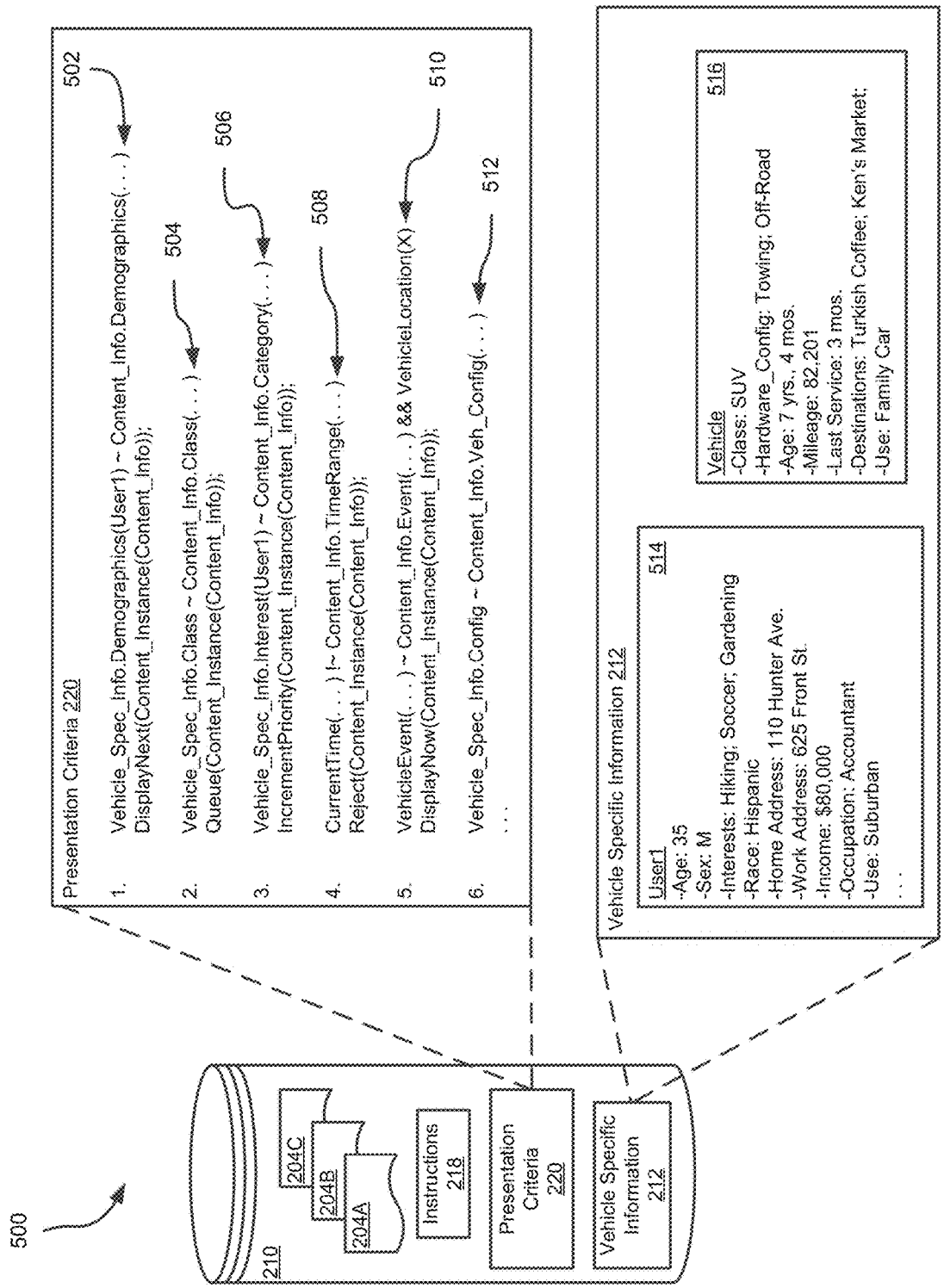
FIG. 5 illustrates a use case example of storage content of the head unit in accordance with embodiments described herein.

FIG. 5 illustrates storage content 500 of the memory 210 of the head unit 104 according to one or more embodiments. The storage content 500 includes the set of presentation criteria 220 and the vehicle specific information 212. As described herein, the set of presentation criteria 220 defines conditions, Boolean logic, relationships, etc., involving content of the vehicle specific information 212 and content of the target vehicle information 205. The set of presentation criteria 220 may be logic preprogrammed and stored in the memory 210 as part of the instructions 218 or as a separate set of instructions, logic, script, or object code that causes the processor 216 to determine presentation of a plurality of content instances 204. In either case, the set of presentation criteria 220 may be periodically updated. The processor 216 may successively evaluate the target vehicle information 205 of the plurality of content instances 204 and the vehicle specific information 212 using the set of presentation criteria 220 to determine which, if any, of the content instances 204 to present as a result. Furthermore, the set of presentation criteria 220 may cause the processor 216 to adjust the priority of content instances 204 relative to other content instances or to decline to present a content instance 204 that was previously marked for presentation. The set of presentation criteria 220 may also specify operations to perform as a result of determining that at least a part of the vehicle specific information 212 and at least a part of the target vehicle information 205 satisfy a criterion of the set of presentation criteria 220.

An example of how content instances 204 may be evaluated using the presentation criteria 220 shown in FIG. 5 will now be described; however, this example is merely illustrative and not intended to limit the scope of the instant disclosure. The presentation criteria 220 include first criteria 502 involving demographics of a user. The first criteria 502 specifies that, as a result of determining that the user information 514 includes demographic information corresponding to or matching target demographic information of the target vehicle information 205, the head unit 104 should cause the content instance 204 of the target vehicle information 205 to be presented on the display next. The presentation criteria 220 also include second criteria 504 involving the vehicle class of the vehicle 102. The second criteria 504 specifies that, as a result of determining that vehicle information 516 regarding the vehicle 102 specifies a vehicle class corresponding to or matching a vehicle class specified in the target vehicle information 205, the head unit 104 should add the content instance 204 of the target vehicle information 205 to a queue of content instances 204 marked for presentation. The presentation criteria 220 also include third criteria 506 involving interests of a user. The third criteria 506 specifies that a priority of a content instance 204 should be incremented relative to other content instances 204 if a category of the content instance 204 matches an interest of the user, as indicated in the user information 514. In another example, the comparison of the target vehicle information 205 with the vehicle specific information 212 should result in multiple matches in relation to multiple presentation criteria 220 before a content instance 204 is presented via the head unit 104.

The set of presentation criteria 220 may include criteria involving time, date, vehicle location, and vehicle operation events, by way of non-limiting example. Fourth criteria 508 may involve a current time relative to a time range specified in the target vehicle information 205. For instance, the fourth criteria 508 specify that a content instance 204 should not be presented if the current time is not within a time range specified in the target vehicle information 205. Criteria involving time may also involve a calendar date, season, or day of the week. Fifth criteria 510 specify that, as a result of a vehicle operation event occurring at a specific location, a content instance 204 should be presented now. For instance, if the vehicle is turned off at a grocery store, the head unit 104 may display a content instance 204 reminding the user to take their reusable grocery bags or to not leave any children behind. Sixth criteria 512 may specify that, as a result of a vehicle hardware configuration specified in the vehicle information 516 corresponding to or matching a vehicle hardware configuration specified in the target vehicle information 205, an operation should be performed involving a corresponding content instance of the plurality of content instances 204 received.

The user information 514 comprises one or more data objects storing data regarding a user or collection of users of the vehicle 102. The user information 514 may comprise demographic information (e.g., age, gender, race); information regarding interests of the user; location information associated with a user, such as work, home, or school addresses; professional and education information. The user information 514 may include destination information regarding previous destinations of the user. A user may provide the user information 514 by entering the information as user input to a touchscreen display 208 of the head unit 104, which may then store the entered user input as user information 514. Alternatively, the user information 514 may be obtained by the head unit 104 via the accessory communication network 106. For instance, a user may connect (e.g., pair) his mobile device 114 with the head unit 104 through the communication interface 214 of the head unit 104 (or communication interface of the vehicle 102). The user may authorize establishment of a private connection with the head unit 104 and enter user information 514 via an application on the mobile device 114. The user may alternatively authorize the head unit 104 to automatically access content from applications on the mobile device 114 to obtain at least some of the user information 514. The head unit 104 may store the user information 514 in a protected manner such that the head unit 104 does not transmit the user information 514 or provide or allow other hardware or software external to the head unit 104 access to the user information 514 without authorization from the user. As a result, the user information 514 is protected and the privacy of the user is not compromised via the head unit 104.

The vehicle information 516 comprises one or more data objects storing data regarding the vehicle 102. Some of the vehicle information 516, such as the class, make, and model, may be static information. Some of the vehicle information 516 may be dynamic information that is updated or changed, such as fuel level or battery voltage. Vehicle information 516 representative of the mileage or the age of the vehicle 102 may be updated based on use or on a periodic basis. Some of the vehicle information 516 may be updated as a result of certain events. For instance, the head unit 104 may interface with the vehicle 102 through a user interface and update the last service date as a result of corresponding events received over a communication bus of the vehicle 102. As another example, the head unit 104 may receive instructions to navigate the user to a particular destination via a global positioning system (GPS) receiver of the head unit 104 and may update the vehicle information 516 to include information representative of the particular destination. Alternatively, the head unit 104 may obtain, upon authorization by the user to do so, destination information from a navigation application on a mobile device 114 of the user and update the vehicle information 516 based on the destination information obtained.

In some embodiments, the head unit 104 may determine or identify interests of a user or group of users based on the destination information obtained, which may then be used in connection with the set of presentation criteria 220 for evaluation of content instances 204. The head unit 104 may store the vehicle information 516 in a protected manner such that the head unit 104 does not transmit the vehicle information 516 or provide or allow other hardware or software external to the head unit 104 access to the vehicle information 516 without authorization from the user. As a result, the vehicle information 516 is protected and the privacy of the user is not compromised via the head unit 104.

The head unit 104 may determine which content instances 204 to present based on use of the vehicle 102. The head unit 104 may modify the vehicle specific information 212 based on how the vehicle is used, such as whether the vehicle is primarily used in urban, suburban, or rural settings. The processor 216 may track a location of the vehicle over time using GPS information and determine use characteristics of the vehicle or a specific user based on the tracked location. If, for example, a user uses the vehicle 102 in primarily suburban settings, the processor 216 may update the vehicle specific information 212 to contain information indicating primarily suburban use of the vehicle. The head unit 104 may also track use of the vehicle by destination to determine how the vehicle 102 is used. The head unit 104 may determine that the vehicle 102 is used primarily as a family car as a result of tracking that the vehicle 102 is driven between home and a school during the week. As another non-limiting example, the head unit 104 may determine that the vehicle 102 is a daily driver as a result of tracking the vehicle 102 between home and work during the week. Use of the vehicle may be reflected in the user information 514 and/or the vehicle information 516.

Modifying the vehicle specific information 212 according to vehicle use enables the head unit 104 to improve targeting of content to the user(s) of the vehicle. The vehicle specific information 212, for instance, indicates that the vehicle is a sport utility vehicle with an off-road package. Based on this information alone, the head unit 104 may provide content instances 204 directed toward outdoor recreation. However, as a result of tracking specific use of the vehicle 102 based on vehicle location and destination tracking, the head unit 104 may determine that the vehicle 102 is actually used as a family car and provide content appropriate to such use. By contrast, the head unit 104 may identify a vehicle 102 frequently used to travel in mountainous terrain as having off-road or rural use. Vehicle use may be correlated according to time and date such that use of the vehicle 102 may be tagged as having one use characteristic during the week and another use characteristic during the weekends, as one example. The vehicle specific information 212 may include more than one vehicle use characteristic.

Some content instances 204 may include policy content that causes the head unit 104 to collect and store information as vehicle specific information 212. For instance, the policy content may include instructions for collecting certain vehicle operation information regarding operation of the vehicle 102. The vehicle operation information may be obtained from one or more accessories 108a-108c or another system of the vehicle 102, such as from an electronic control unit of the vehicle. The vehicle operation information may be indicative of conditions or events associated with operation of the vehicle 102, such as speed, efficiency, and hazardous conditions. The head unit 104 of the vehicle 102 may adjust presentation of audio-visual content of the plurality of content instances 204 based on this vehicle operation information. For example, if the vehicle operation information indicates multiple wheel slippage or a high rate of velocity, then the head unit 104 may pause or reduce the presentation of content to the user of the vehicle 102 so as to reduce distractions while the wheel slippage is occurring or the vehicle is over a certain speed.

In some embodiments, the policy information causes the head unit 104 to communicate with entities external to the vehicle 102. As one example, a first vehicle may be in communication with a second vehicle via a vehicle-to-vehicle communication channel. In some embodiments, the head unit 104 transmits, or causes transmission of, vehicle specific information 212 to the remote server 124, which may perform one or more operations in response. As an example, the head unit 104 may transmit, over the network 206, information indicative of traffic or hazardous road conditions. In response, the server 124 may generate information indicative of hazardous driving or traffic congestion conditions and send content to vehicles 102 indicating the conditions. The head unit 104 may determine whether to implement policy content based on criteria included in or associated with the policy information or based on the presentation criteria 220.

Figure 6:
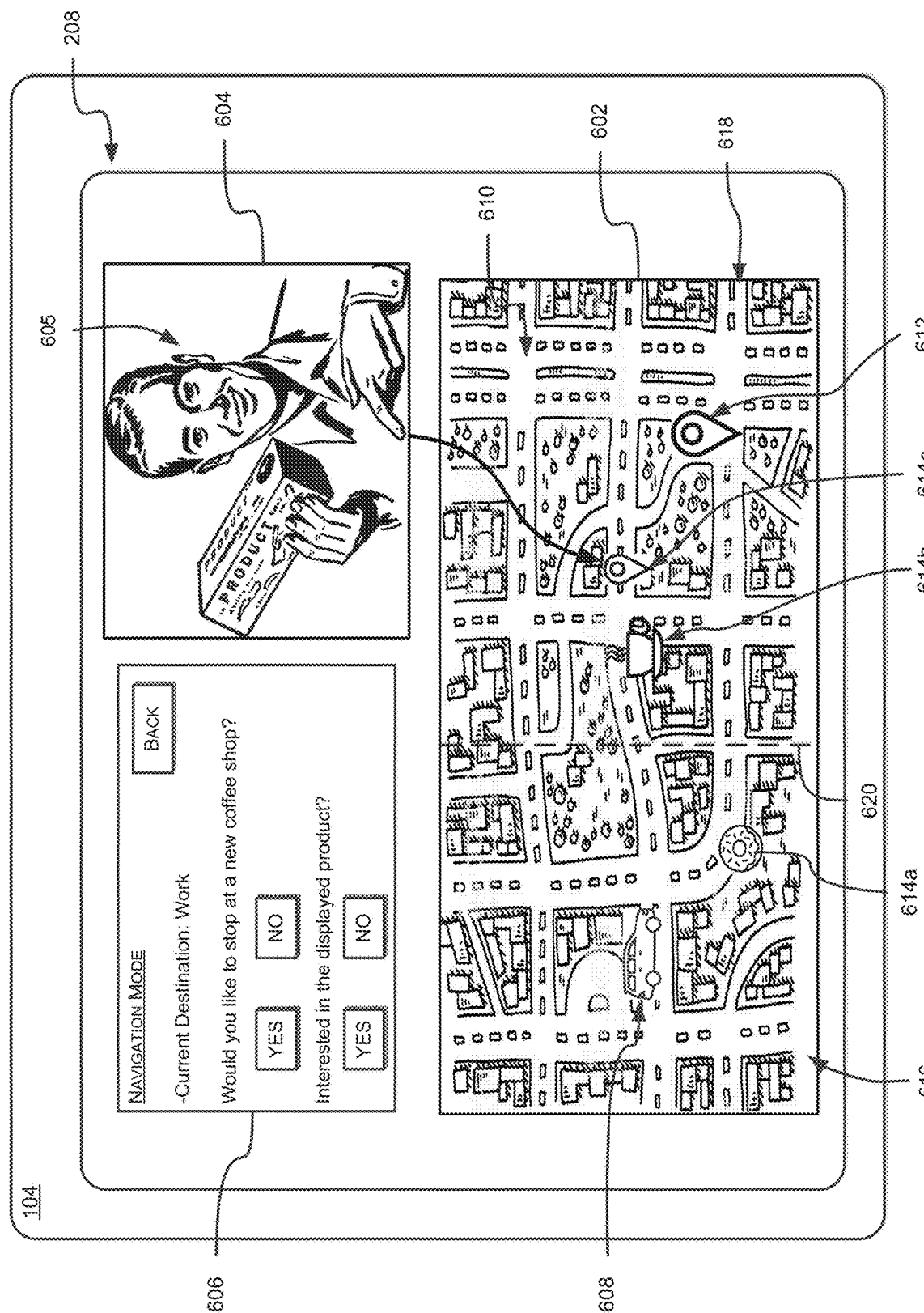
FIG. 6 illustrates a use case example of content corresponding to the one or more selected content instances displayed on the display of a head unit in accordance with embodiments described herein.

FIG. 6 illustrates the display 208 of the head unit 104 displaying a set of content instances 204 according to one or more implementations. The display 208 shown in FIG. 6 includes a navigation portion 602, a visual content presentation portion 604, and a control portion 606. The navigation portion 602 displays a vehicle icon 608 representative of a current location of the vehicle 102 relative to a map 610 based on received GPS information. The navigation portion 602 includes a destination icon 612 corresponding to a destination to which the head unit 104 may be set to navigate. The visual content presentation portion 604 presents visual content 605 corresponding to a content instance 204 selected by the head unit 104 for presentation, as discussed herein. Using the control portion 606, a user may navigate through various menus of the head unit 104 to control and monitor various aspects of the vehicle 102 and/or the head unit 104, such as audio system playback, mobile device connections, environmental controls, and the like. Using the control portion 606, the user may also provide user input regarding the visual content of the selected content instances 204 displayed on the display 208.

The navigation portion 602 may also display visual content 614 corresponding to the content instances 204 selected by the head unit 104. The visual content 614 displayed in the navigation portion 602 may include icons illustrative of goods or services offered at the corresponding location. For instance, first visual content 614a of the navigation portion 602 is a donut icon that may correspond to a bakery and a second visual content 614b is a cup of coffee that may correspond to a coffee shop. Some visual content displayed, such as a third visual content 614c, may be icons unrepresentative of the goods or services offered at the corresponding location. The visual content in some portions may be linked to visual content in other portions. The visual content 605 in the visual content presentation portion 604, for example, is associated with the third visual content 614c. In particular, the visual content 605 may include video, animation, or images that depict goods or services offered at the corresponding location on the map 610 in greater detail than is possible with an icon. The video content 605 may include or have associated therewith audio data that, as a result of processing, causes the head unit 104 to generate audio in connection with presentation of the video or image content. In some embodiments, content instances received may be audio data that causes the head unit 104 to emit sound, such as a chime, sound, or short song associated with a store or other location. As another example, head unit 104 may be configured to cause one or more other components to provide a haptic feedback as part of the presentation, such as a vibration to be sensed through the steering wheel or the mobile device 114.

Display of the visual content 605 may be activated, in some instances, as a result of user input with the third visual content 614c. The head unit 104 may, in response to user input interacting with visual content presented, modify the user information 514 to reflect an interest in a category or particular location. The head unit 104 may also track user interests via interaction with the control portion 606 and modify the user information 514 accordingly. The head unit 104 may also cause output of audio content in connection with visual content presented on the display 208. In some embodiments, the head unit 104 may cause mobile device 114 to present selected content instances 204 instead of, or along with, the display 208. For example, the head unit 104 may transmit a selected content instance 204 to a mobile device 114 having an established private or secure connection with the head unit 104, causing the mobile device 114 to present corresponding visual, audio, or haptic content.

The head unit 104 may display various content related to safety, maintenance, or operation of the vehicle 102. Such display may be, at least in some instances, based on the vehicle specific information 212. In response to detecting a flat tire, for instance, a vehicle 102 having vehicle specific information 212 indicating that the vehicle 102 is primarily for family use may display a content instance indicating contact information of the nearest roadside assistance whereas a vehicle 102 having vehicle specific information 212 indicating that the vehicle 102 is primarily for off-road use may display directions for changing the flat tire. The head unit 104 may instead provide a menu displaying options for addressing the flat tire that the user can interact with to selectively obtain directions for changing the tire, contacting roadside assistance, etc. The head unit 104 may display safety-related content instances 204 indicating a safety-related issue with the vehicle 102 and displaying nearby vehicle shops for addressing the safety-related issue. In such situations, content instances regarding safety-notices, recalls, failure risks, etc., may be previously received and presented by the head unit 104 at a later time. Content instances may include owner's manual information instructing the user on how to install a car seat, operate environmental controls, etc., which may be accessed automatically or manually via the display 208.

In another arrangement, the vehicle 102 may be equipped with systems that can predict the imminent or eventual failure of a component of the vehicle 102. This data can be fed to the processor 116 of the head unit 104 and may be integrated as part of the vehicle specific information 212. For example, the standing voltage of the battery of the vehicle 102 may be measured consistently below a predetermined threshold, indicating the battery may eventually fail to start the vehicle 102. During the comparison of the target vehicle information 205 with the vehicle specific information 212, the processor 116, in conjunction with the presentation criteria, may determine that a content instance 204 related to an automotive-service facility should be presented on the head unit 104, with possibly a warning to the driver of the impending battery failure.

The head unit 104 may discontinue the display of some content as a result of transitioning from one geographic region to another. As shown in FIG. 6, while in a first geographic region 616, the head unit 104 may display content corresponding to the first geographic region 616, such as the first content 614a. As a result of travelling from the first geographic region 616 into a second geographic region 618, the head unit 104 may discontinue displaying the content of the first geographic region 616 and begin displaying content of the second geographic region 618, such as the second and third content 614b and 614c. The first geographic region 616 may be separated from the second geographic region 618 by a boundary 620. The boundary 620 may be representative of a transmission region of one or more antennae located in the respective regions, representative of a physical boundary (e.g., river, lake, canyon), representative of an imaginary boundary (e.g., state line, county line) or representative of any other parameter. For instance, as a result of no longer receiving transmissions from an antenna 202 in the first geographic region 616, the head unit 104 may discontinue displaying content corresponding to the first geographic region 616.

Figure 7:
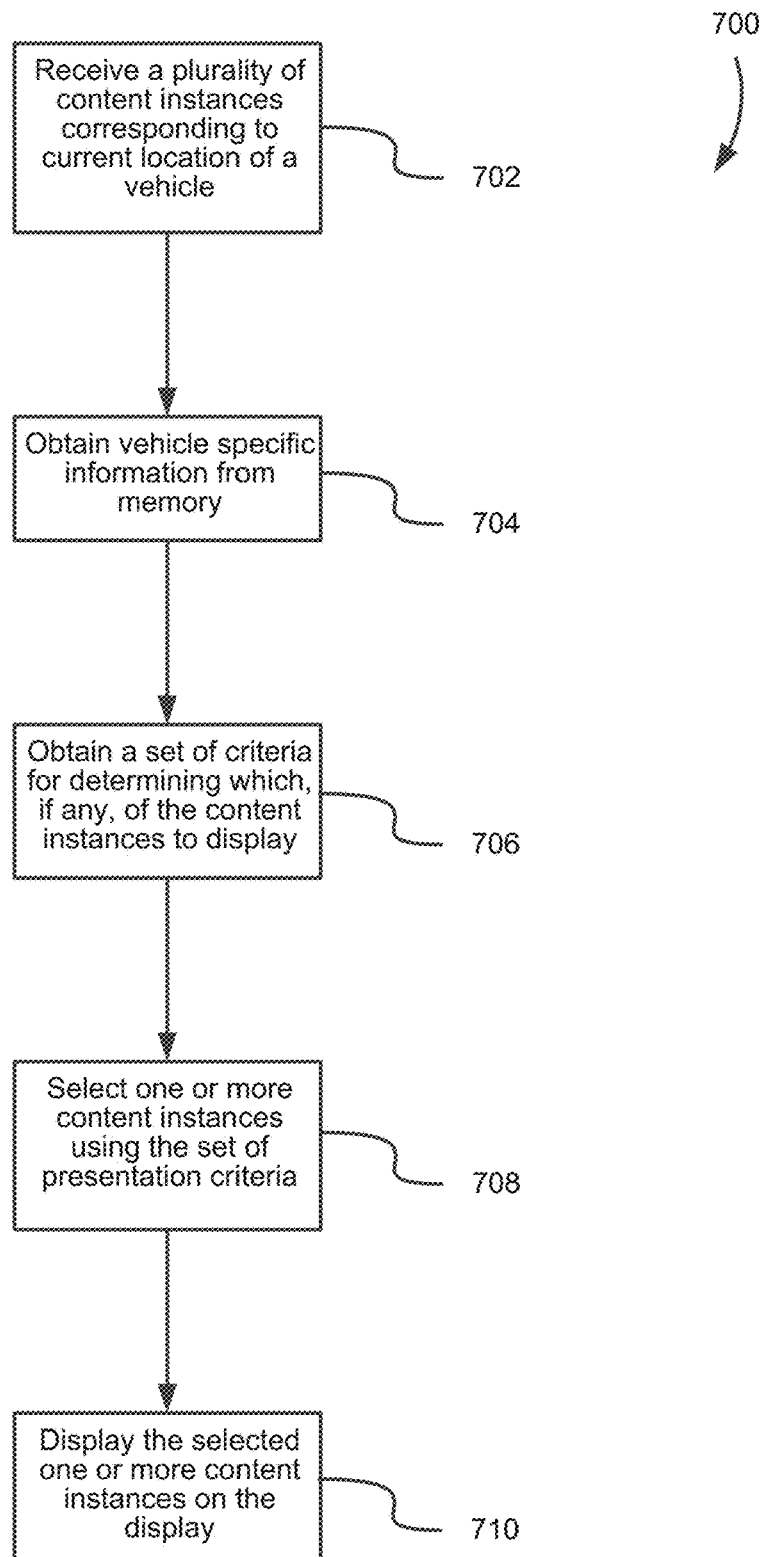
FIG. 7 illustrates a method for selecting and displaying one or more content instances of the plurality of content instances in accordance with embodiments described herein.

FIG. 7 illustrates a method 700 of operating the head unit 104 according to one or more embodiments described herein. The method 700 begins by receiving 702 a plurality of content instances 204 corresponding to a current location of the vehicle 102 in which the head unit 104 is installed. The plurality of content instances 204 are received 702 over the network 206 without the head unit 104 previously requesting provisioning of the plurality of content instances 204. In some embodiments, the plurality of content instances 204 are received 702 in response to the head unit 104 providing location information regarding a current location of the vehicle 102. In other embodiments, the plurality of content instances 204 are received 702 without the head unit 104 providing location information regarding the current location of the vehicle 102. The plurality of content instances 204 may be received 702 as a result of the vehicle 102 being in a particular region 232 associated with the plurality of content instances 204.

At 704, the method 700 includes obtaining, from the memory 210, the vehicle specific information 212, which may include the user information 514 and the vehicle information 516, as described above with respect to FIG. 5, for instance. At 706, the method 700 includes obtaining a set of criteria for determining which, if any, of the plurality of content instances 204 should be presented on the display 208. Obtaining 706 the set of criteria includes obtaining, from the memory 210, the set of presentation criteria 220. In some embodiments, at least some of the set of criteria may be obtained from the target vehicle information 205 received in connection with the plurality of content instance 204.

At 708, the method 700 may include selecting one or more content instances of the plurality of content instances 204 using the set of presentation criteria 220. Selecting 708 the one or more content instances may be based at least in part on an evaluation involving the vehicle specific information 212 and associated information of the plurality of content instances 204, as described in further detail with respect to FIG. 9 and elsewhere herein. As a result of selecting 708 the one or more content instances, the method 700 includes displaying 710, or otherwise causing the display of, the one or more selected content instance on the display 208.

Figure 8:
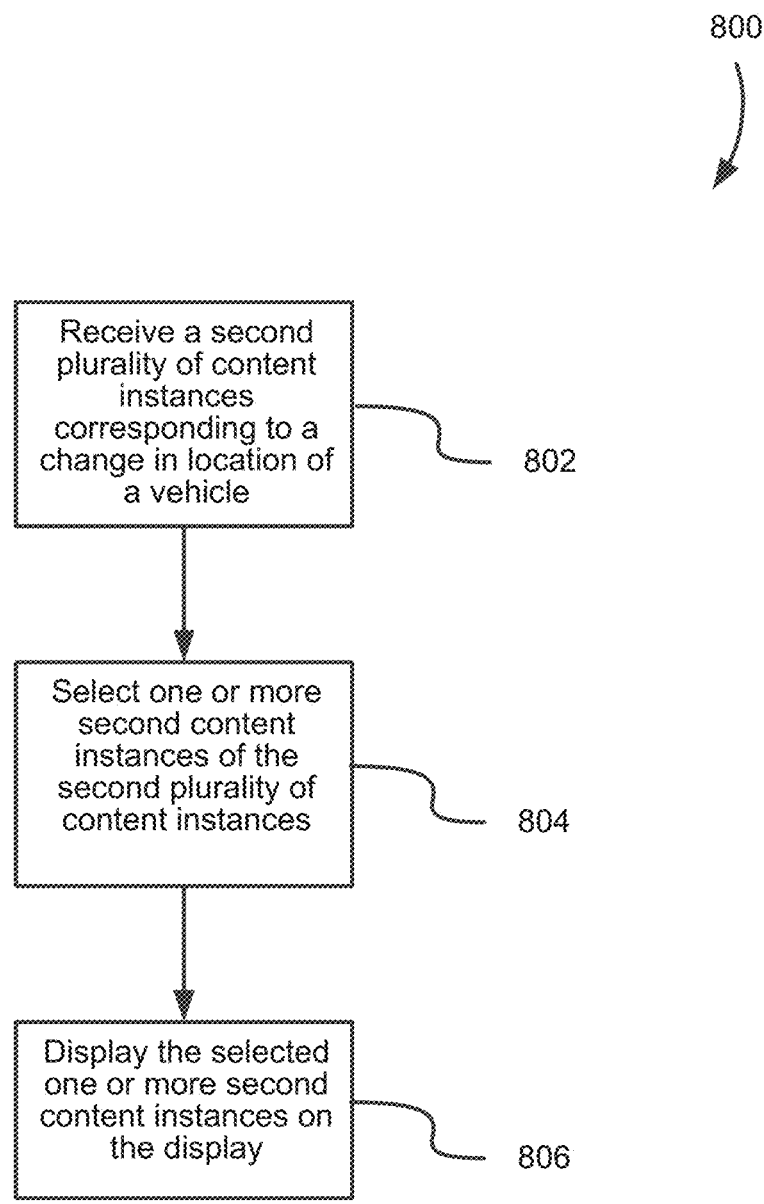
FIG. 8 illustrates a method for selecting and displaying one or more second content instances of a second plurality of content instances in accordance with embodiments described herein.

FIG. 8 shows a method 800 for selecting one or more second content instances of a second plurality of content instances 204 according to one or more embodiments. The method 800 is a continuation of the method 700 and may proceed from any one of steps 702 through 710 discussed with respect to FIG. 7. The method 800 proceeds by receiving 802 a second plurality of content instances different from the plurality of content instances of the method 700. The second plurality of content instances may be received 802 as a result of the vehicle 102 changing locations from one transmission region to another transmission region. For example, with reference to FIG. 3, the head unit 104 of the vehicle 102a may receive a first plurality of content instances corresponding to the content instances 204a-c in the first transmission region 232a. Then, the vehicle 102a may be driven to the third transmission region 232c in which the head unit 104 receives a second plurality of content instances corresponding to the content instances 204g-i in the third transmission region 232c.

At 804, the method 800 includes selecting 804 one or more second content instances of the second plurality of content instances. Selecting 804 one or more second content instances is performed according to operations described with respect to FIG. 7 and elsewhere herein. At 806, the head unit 104 causes the one or more second content instances selected to be displayed on the display 208.

Figure 9:
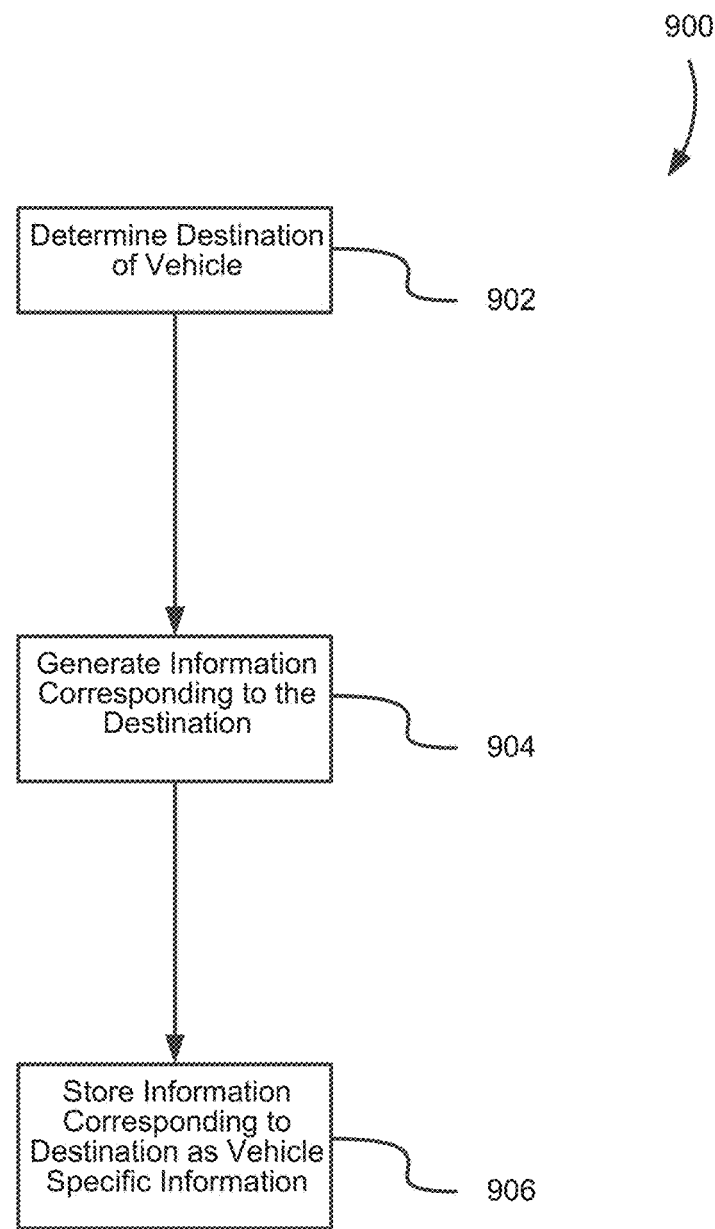
FIG. 9 illustrates a method for storing information regarding a destination of a vehicle as part of vehicle specific information in accordance with embodiments described herein.

FIG. 9 shows a method 900 of storing information regarding a destination of a vehicle as part of the vehicle specific information 212 according to one or more embodiments. The method 900 may be performed in connection with or as part of the method 700 or the method 800. The method 900 begins by identifying 902 a destination of the vehicle 102. Identifying 902 the destination may include receiving information entered into a navigation system of the head unit 104. Identifying the destination may include receiving GPS information indicating a current position of the vehicle in connection with receiving a signal from the vehicle 102 indicating the occurrence of a vehicle operation event of a defined set of vehicle operation events. Such defined events may include the vehicle 102 turning off or a passenger car door opening while the vehicle 102 is stopped.

At 904 of the method 900, the head unit 104 generates information corresponding to the destination. Such information may include information regarding a category or type of the destination, or information regarding interests associated with the destination. If the vehicle 102 stops at a yoga studio, for example, the head unit 104 may generate interest information indicating that a user of the vehicle 102 is interested in fitness, yoga, health, etc. The head unit 104 may then store 906 the information generated in 904 as part of the vehicle specific information 212. The interest information regarding user interest in fitness, yoga, and/or health may be stored as part of the user information 514. Consequently, when the head unit 104 is selecting one or more content instances, the interest information stored based on a previous destination of the vehicle 102 may be considered as part of the selection.

Figure 10:
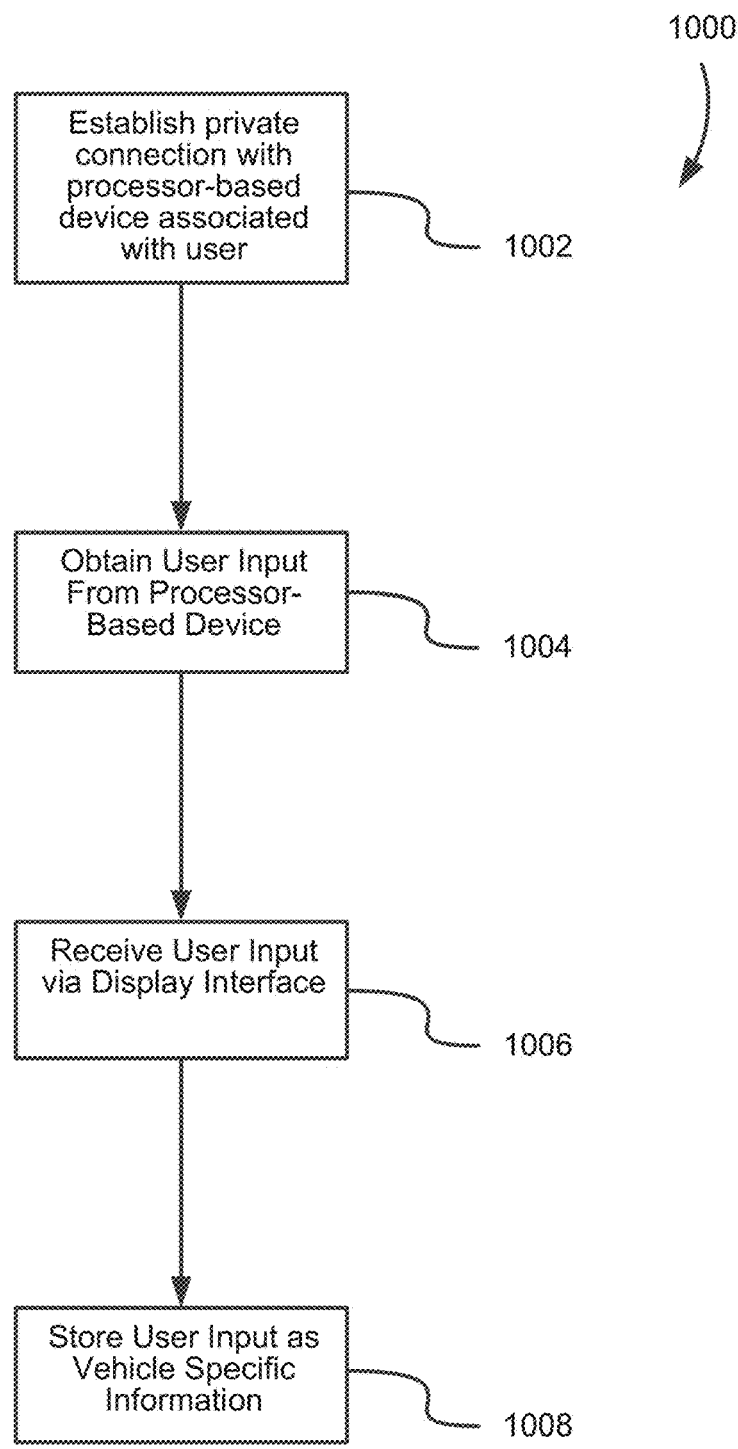
FIG. 10 illustrates a method for storing user-specific input as part of the vehicle specific information in accordance with embodiments described herein.

FIG. 10 illustrates a method 1000 for storing user-specific input as part of the vehicle specific information 212 according to one or more embodiments. The method 1000 may optionally begin by establishing 1002 a private connection between the head unit 104 and a processor-based device of the user, such as the mobile device 114. The private connection is a wired or wireless connection established directly between the head unit 104 and the mobile device 114 as a result of a user input to do so. The head unit 104 may then obtain 1004 input including information regarding the user, such as demographic information, from the processor-based device. Such information may be obtained as a result of the user providing user input to a mobile application, of the processor-based device, for interfacing with the head unit 104, wherein the mobile application causes the user input to be securely transmitted to the head unit 104. As another example, the user-specific input may be obtained from one or more third party applications of the mobile device 114 and transmitted to the head unit 104 as a result of the user providing authorization and input to do so. One or both of obtaining 1004 and receiving 1006 user input may be performed as part of the method 1000. At 1008, the head unit 104 stores the user input obtained 1004 and/or received 1006 as part of the user information 514, included in the vehicle specific information 212.

Each of the methods 700, 800, 900 is not limited to its corresponding chronological order presented here. Moreover, each method 700, 800, 900 may include additional or even fewer steps than those illustrated in the associated figures.

Other configurations or examples may apply to the subject matter described herein. For example, the content instances 204 may be delivered to the vehicle 102 through a hardwired connection, which may be present when the vehicle 102 is undergoing repairs or is being refueled or charged. In addition, the content instances 204 may be streamed to the head unit 104, as opposed to being stored in the memory 210, and presented as part of an existing source of streamed content (like music) or independent of any other content. Moreover, data related to the user's interactions with content instances 204 that are presented may be collected and delivered to a remote facility. In such a case, the remote facility may include servers loaded with machine learning (ML) models, which may be trained using the collected data. These ML models may then be used to adjust the content, delivery, or presentation of the content instances 204 or modify the process of comparing the target vehicle information 205 with the vehicle specific information 212.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims but should be construed to include all possible embodiments along with the full scope of equivalents to which such claims are entitled. Accordingly, the claims are not limited by the disclosure.

The invention claimed is:

1. A head unit of a vehicle, comprising:
a display device that is configured to display content;
a memory that is configured to store computer instructions and information specific to the vehicle; and
one or more processors that are configured to execute the computer instructions to:
receive, while the vehicle is in a first geographic area, a first plurality of separate content instances corresponding to the first geographic area without a previous transmission of a request for the first plurality of separate content instances, wherein each separate content instance includes content to display via the display device and corresponding target vehicle information;
obtain, from the memory, the information specific to the vehicle;
select a first content instance from the plurality of separate content instances based on a comparison between the information specific to the vehicle and the target vehicle information of each of the first plurality of separate content instances;
display the content associated with the first content instance on the display device;
receive a second plurality of separate content instances as a result of the vehicle being located in a second geographic area different from the first geographic area;
select a second content instance from the second plurality of separate content instances based on a comparison between the information specific to the vehicle and the target vehicle information of each of the second plurality of separate content instances; and
display the content associated with the second content instance on the display device subsequent to discontinuing display of the content associated with the first content instance.

2. The head unit of claim 1, wherein the one or more processors are configured to execute further computer instructions to:
select the first content instance based on a set of criteria for evaluating display of content in a target vehicle.

3. The head unit of claim 1, wherein the one or more processors are configured to execute further computer instructions to:
provide, over a network to a remote server, location information representative of the current location of the vehicle; and
receive the first plurality of separate content instances in response to providing the location information.

4. The head unit of claim 1, wherein the one or more processors are configured to execute further computer instructions to:
determine a set of candidate content instances of the first plurality of separate content instances based on a set of criteria for determining content to display in a target vehicle; and
select the first content instance from among the set of candidate content instances based on the set of criteria.

5. The head unit of claim 1, wherein the information specific to the vehicle includes two or more of information indicative of a class of the vehicle, information indicative of a mileage of the vehicle, information indicative of a model of the vehicle, information indicative of a use of the vehicle, and information representative of a hardware configuration of the vehicle.

6. The head unit of claim 1, wherein the one or more processors are configured to execute further computer instructions to:
    select a subset of the first plurality of separate content instances based on the information specific to the vehicle; and
    determine an order in which the subset of content instances are to be displayed on the display device based on a set of criteria for determining content to display in a target vehicle.

7. The head unit of claim 1, wherein the processor is configured to execute further computer instructions to:
    receive information specifying a set of criteria associated with individual content instances of the first plurality of separate content instances, and
    select the first content instances from the first plurality of separate content instances based on whether the information specific to the vehicle satisfies one or more of the set of criteria.

8. The head unit of claim 1, wherein the processor is configured to execute further computer instructions to:
    receive a signal from the vehicle indicative of a vehicle operation event; and
    select the first content instance from the plurality of separate content instances based at least on the signal received.

9. A computer-implemented method, comprising:
    receiving, by a head unit of a vehicle and over a network, a plurality of content objects corresponding to a geographic region of the vehicle without previously transmitting a request for the plurality of content objects;
    obtaining, by the head unit and from a memory on the vehicle, information specific to the vehicle;
    selecting, by the head unit, a content object from the plurality of content objects based on the information specific to the vehicle and a set of criteria for determining content to display; and
    causing, by the head unit, an output device to present the selected content object.

10. The computer-implemented method of claim 9, further comprising:
    identifying a destination of the vehicle;
    generating destination information corresponding to the destination; and
    storing the destination information as part of the information specific to the vehicle.

11. The computer-implemented method of claim 10, wherein the destination information includes information regarding an interest of a user of the vehicle, and selecting the content object from the plurality of content objects based on a determination that the interest of the user corresponds to interest information associated with the selected content object.

12. The computer-implemented method of claim 10, wherein the destination information includes information regarding a category of the destination, and selecting the content object is based on a determination that content category information associated with the selected content object corresponds to the category of the destination.

13. The computer-implemented method of claim 10, wherein identifying the destination of the vehicle is in response to a vehicle operation event.

14. The computer-implemented method of claim 9, further comprising:
    receiving vehicle use information indicating usage characteristics of the vehicle; and
    modifying the information specific to the vehicle based on the vehicle use information.

15. The computer-implemented method of claim 9, wherein the selecting of the content object from the plurality of content objects includes:
    selecting a content item relating to safety based on the information specific to the vehicle and the geographic region of the vehicle.

16. The computer-implemented method of claim 9, wherein the selecting of the content object from the plurality of content objects includes:
    selecting a content item including vehicle maintenance content based on the information specific to the vehicle.

17. A display system of a vehicle, comprising:
    a display device that displays content;
    a memory that is configured to store computer instructions and information specific to the vehicle; and
    one or more processors that are configured to execute the computer instructions to:
        receive, over a network, information representative of each of a plurality of content items corresponding to a geographic region in which the vehicle is currently located;
        receive user input specifying information specific to a user associated with the vehicle;
        store the information specific to the user as part of the information specific to the vehicle with restrictions that prevent the display system from transmitting the information specific to the user over the network;
        obtain, from the memory, the information specific to the vehicle, including the information specific to the user;
        select, based on the information specific to the vehicle, a content item from the plurality of content items; and
        cause the selected content item to be displayed on the display device.

18. The display system of claim 17, further comprising:
    a communication interface, wherein the one or more processors are configured to execute further computer instructions to receive the information specific to the user from a processor-based device associated with the user via a user-authorized connection between the processor-based device and the communication interface.

19. The display system of claim 17, wherein the one or more processors are configured to execute further computer instructions to:
    access the content item from a remote server using the information representative of the selected content item.

* * * * *